No. 889,757. PATENTED JUNE 2, 1908.
K. S. BUNTING.
MACHINE FOR GATHERING COTTON SQUARES.
APPLICATION FILED OCT. 1, 1907.

2 SHEETS—SHEET 1.

WITNESSES

INVENTOR
KARL S. BUNTING.
BY
ATTORNEYS

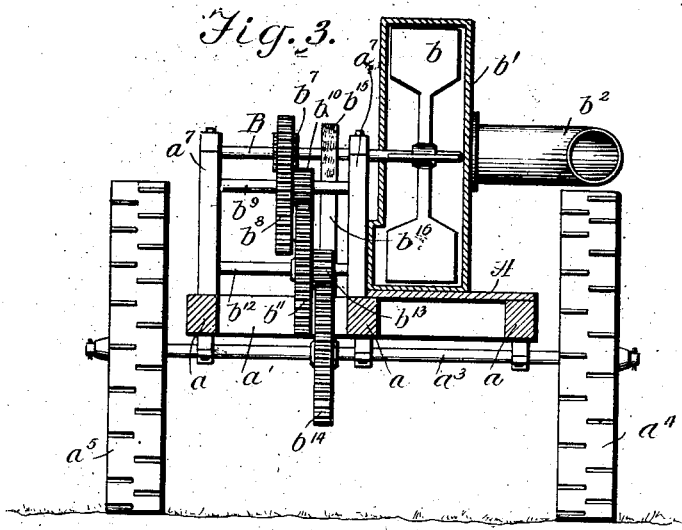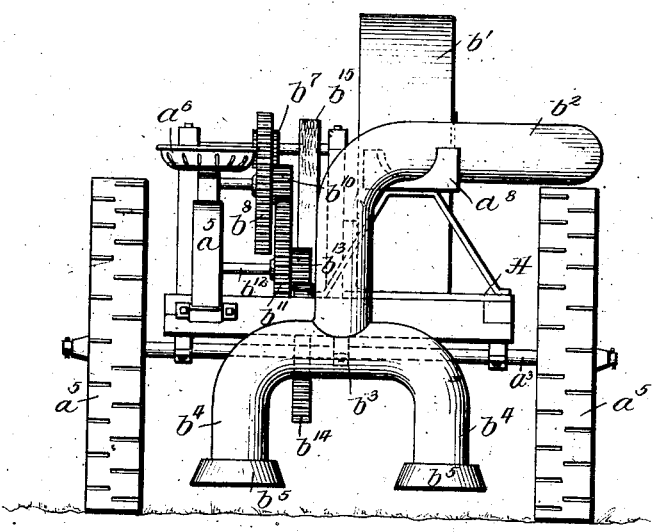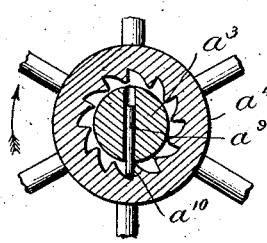

UNITED STATES PATENT OFFICE.

KARL SAXTON BUNTING, OF MOULTON, TEXAS.

MACHINE FOR GATHERING COTTON-SQUARES.

No. 889,757.     Specification of Letters Patent.     Patented June 2, 1908.

Application filed October 1, 1907. Serial No. 395,380.

*To all whom it may concern:*

Be it known that I, KARL SAXTON BUNTING, a citizen of the United States, and a resident of Moulton, in the county of Lavaca and State of Texas, have invented an Improvement in Machines for Gathering Cotton-Squares, of which the following is a specification.

My invention is an improvement in machines for gathering cotton squares, and consists in certain novel constructions and combinations of parts hereinafter described and claimed.

Figure 1:
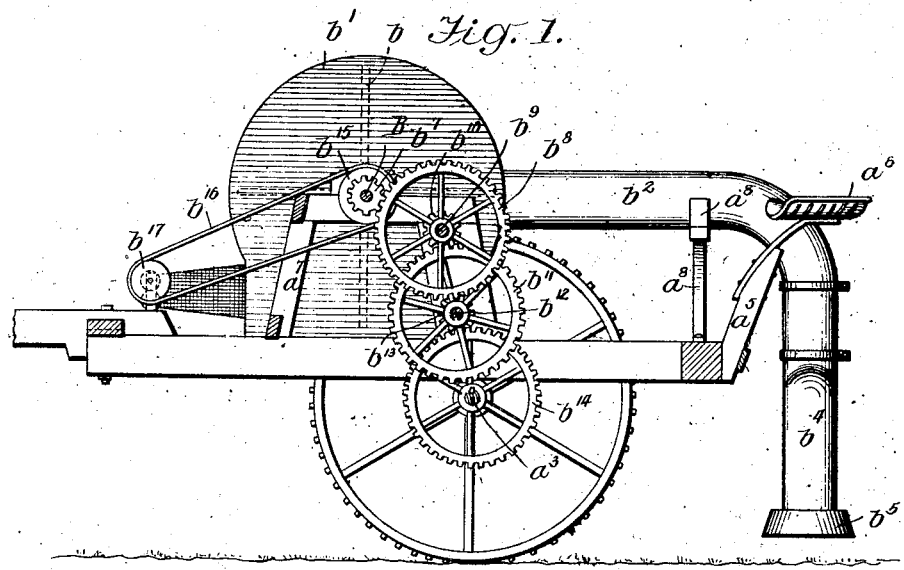
Figure 2:
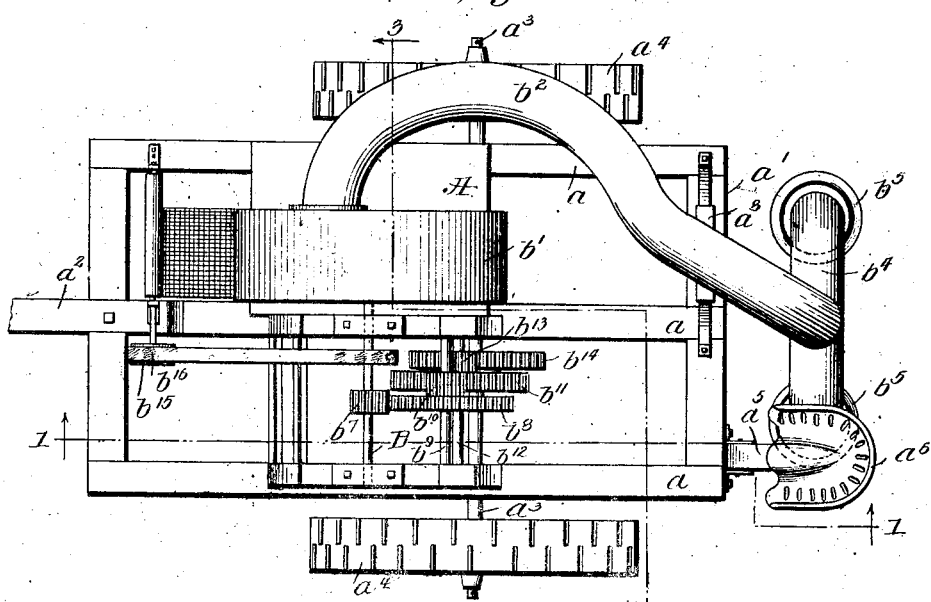

Referring to the drawings forming a part hereof, Figure 1 is a section on the line 1—1 of Fig. 2. Fig. 2 is a top plan view of the machine. Fig. 3 is a section on the line 3—3 of Fig. 2. Fig. 4 is a rear view of the machine; and Fig. 5 is a detail of the pawl and ratchet connection between the wheel and the axle.

My improvement is designed to gather up cotton squares which have been punctured by the boll weevil, and to pass the gathered squares between a set of rollers which press the squares, thus killing the eggs and the insects.

The machine comprises a frame A composed of longitudinal bars $a$ connected by cross bars $a'$, a tongue $a^2$ being connected to the central longitudinal bar and the front cross bar, for the purpose of drawing the machine. An axle $a^3$ is journaled on the frame and to each end of the axle is secured a wheel $a^4$. A bracket $a^5$ is connected with the rear of the frame at one corner thereof, as shown in Fig. 2, and a seat $a^6$ is supported by the bracket. Brackets $a^7$ are connected with the intermediate longitudinal bar and one of the side bars, and journaled on the brackets is a fan shaft B, provided with vanes $b$, the vanes being inclosed by a casing $b'$, having outlet and inlet openings for a purpose to be presently described.

The inlet opening of the casing has connected thereto a supply pipe $b^2$, which leads to the rear of the machine and bifurcates as at $b^3$, the branches $b^4$ diverging from each other and thence extending parallel to a point adjacent to the ground, as shown in Fig. 1, the lower end of each of the branches being provided with an enlarged mouth $b^5$.

A gauze container $b^6$ is connected with the outlet of the fan casing, and extends forwardly therefrom, and a pair of rolls C are arranged at the outlet of the container, the said rolls extending entirely across the outlet, closing it except for the passage between the rolls.

The fan shaft B is provided on its inner end outside of the casing with a pinion $b^7$, meshing with a gear wheel $b^8$ on a stud shaft $b^9$, supported by the brackets $a^7$, and the stud shaft is provided with a pinion $b^{10}$, meshing with a gear wheel $b^{11}$ on another stud shaft $b^{12}$, also supported by the bracket. The stud shaft $b^{12}$ is provided with a pinion $b^{13}$ meshing with a gear wheel $b^{14}$ on the axle $a^3$ of the frame. The fan shaft B is also provided with a pulley $b^{15}$ connected by a belt $b^{16}$ with a pulley $b^{17}$ on the shaft of the upper roll. A bracket $a^8$ is arranged at the rear of the machine for supporting the supply pipe $b^2$, and the wheels $a^4$ are connected to the axle $a^3$ by a pawl and ratchet mechanism, the mechanism being so arranged as to constrain the axle to turn with the wheels when the machine is moved forwardly, and to release the axle when the machine is moved rearwardly. This construction is shown in Fig. 5, the wheel $a^4$ being provided with an annular series of depressions $a^9$ forming ratchet teeth, and the axle $a^3$ being traversed by an opening in which is slidably arranged a pin $a^{10}$ adapted to engage the teeth.

In operation, the machine is driven through the field with the mouths of the branches of the supply pipe adjacent to the ground. The movement of the machine puts the fan in motion, creating a draft through the supply pipe, which picks up the punctured squares, and the current of air passes them through the fan casing and into the perforated container, from which the air escapes. The squares are forced out between the rolls, which press and kill the eggs and insects.

I claim:

1. A device of the class described, comprising a frame, an axle journaled on the frame, wheels on the ends of the axle, brackets on the frame, a fan comprising a shaft provided with vanes journaled on the brackets, a casing provided with an outlet inclosing the fan, an inlet pipe in connection with the casing, said pipe passing to the rear of the machine and dividing into branches, said branches leading to the sides of the frame and terminating in an enlarged mouth, a pair of co-acting rolls journaled on the frame in front of the fan casing, a gauze container leading from the outlet of the casing to the rolls and opening therebetween, a driving connection between the axle and the fan shaft, and a driving connection between the fan shaft and the rolls.

2. A device of the class described, comprising a frame, a fan casing supported on the frame, a fan comprising a shaft provided with vanes journaled in the casing, said casing being provided with an inlet and an outlet, a pipe connected with the inlet and passing to the rear of the frame and dividing into branches, said branches leading to the sides of the frame and terminating in an enlarged mouth, rolls journaled on the frame in front of the fan casing, a gauze container leading from the outlet of the casing to the rolls and opening therebetween, a driving connection between the axle and the fan shaft, and a driving connection between the fan shaft and the rolls.

3. A device of the class described, comprising a frame, wheels for supporting the frame, a fan casing on the frame, a fan in the casing, an inlet pipe in connection with the casing, said pipe passing to the rear of the machine and dividing into branches, the branches leading to the sides of the frame and terminating in an enlarged mouth, rolls journaled on the frame in front of the casing, a gauze container leading from the casing to the rolls and opening therebetween, means for driving the fan, and means for driving the rolls.

4. A device of the class described, comprising a wheel supported frame, a fan on the frame, a casing inclosing the fan, an inlet pipe leading to the casing, an outlet pipe of perforate material leading from the casing, a pair of rollers at the outer end of the outlet, means for driving the rolls, and means for driving the fan.

KARL SAXTON BUNTING.

Witnesses:
W. G. LEAZAR,
E. J. BUCEK,